(12) United States Patent
Xu et al.

(10) Patent No.: US 6,277,777 B1
(45) Date of Patent: Aug. 21, 2001

(54) BORON-FREE GLASS COMPOSITION AND FILTRATION MEDIA

(75) Inventors: Xiaojie Xu, Littleton; Foster Laverne Harding; Jon Frederick Bauer, both of Castle Rock, all of CO (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 09/366,389

(22) Filed: Aug. 3, 1999

(51) Int. Cl.[7] .......................... C03C 13/00; C03C 13/02; C03C 3/087; B01D 39/20; B01D 46/00
(52) U.S. Cl. ........................ 501/70; 501/57; 501/68; 501/69; 501/72; 501/35; 501/38; 55/527; 55/522; 428/357; 442/180; 65/376; 65/465
(58) Field of Search ....................... 501/57, 68, 69, 501/70, 72, 35, 38; 65/376, 465; 55/522, 524, 527; 428/198, 357, 292.1; 442/180

(56) References Cited

U.S. PATENT DOCUMENTS

| | | |
|---|---|---|
| 3,095,311 | 6/1963 | von Wranau et al. . |
| 3,847,626 | 11/1974 | Erickson et al. . |
| 3,847,627 | 11/1974 | Erickson et al. . |
| 3,861,926 * | 1/1975 | Irlam et al. .............................. 501/70 |
| 3,876,481 | 4/1975 | Erickson et al. . |
| 3,929,497 | 12/1975 | Clark-Monks . |
| 4,026,715 | 5/1977 | Erickson et al. . |
| 4,199,364 | 4/1980 | Neely . |
| 4,439,008 | 3/1984 | Joormann et al. . |
| 4,439,528 | 3/1984 | Araujo . |
| 4,521,524 * | 6/1985 | Yamashita .............................. 501/64 |
| 4,542,106 | 9/1985 | Sproull . |
| 5,071,796 | 12/1991 | Jones et al. . |
| 5,296,294 | 3/1994 | Suzuki et al. . |
| 5,332,698 | 7/1994 | Nyssen et al. . |
| 5,332,699 | 7/1994 | Olds et al. . |
| 5,599,754 * | 2/1997 | Maeda et al. .......................... 501/70 |
| 5,614,449 | 3/1997 | Jensen . |
| 5,631,195 * | 5/1997 | Yanagisawa et al. ................... 501/70 |
| 5,728,187 | 3/1998 | Kern et al. . |
| 5,789,329 | 8/1998 | Estes et al. . |
| 5,888,917 * | 3/1999 | Kawaguchi et al. ................... 501/70 |

FOREIGN PATENT DOCUMENTS

| | | |
|---|---|---|
| 0 516 354 | 4/1997 | (EP) . |
| 11-29344 | 2/1999 | (JP) . |

* cited by examiner

*Primary Examiner*—Michael Marcheschi
(74) *Attorney, Agent, or Firm*—Robert D. Touslee

(57) ABSTRACT

Novel boron-free glass compositions are described which are particularly suited for making fine diameter glass fibers for HEPA electronic clean-room filtration media using flame-attenuation or rotary glass processing.

29 Claims, No Drawings

BORON-FREE GLASS COMPOSITION AND FILTRATION MEDIA

FIELD OF THE INVENTION

This invention relates to glass compositions with unique combinations of properties which are especially useful for high-efficiency fiberglass clean-room filters, especially filters for microelectronic clean-rooms where boron contamination on electronic integrated circuit chips must be avoided. Such filters are herein referred to as High Efficiency Particle Air or "HEPA" filters. The glass compositions of the present invention are substantially free of boron in the sense that no boron oxide ($B_2O_3$) is intentionally added to the glass compositions as an ingredient and that boron is present only in insignificant or trace amounts.

BACKGROUND OF THE INVENTION

Fine diameter fiberglass products intended for end-use service as HEPA clean-room filters have been known for many years, e.g. the fiberglass products marketed by Johns Manville International Inc. under the trademark MICROFIBER. These HEPA clean-room filters are used by the medical, pharmaceutical, and microelectronics industry in settings where ultra-pure air is required. Recently, a particular problem has come to light in the microelectronics industry as the circuits on chips have evolved toward nano-scale. Boron vapors from glass fiber HEPA filters have been implicated as a source of defects found in such microelectronic components. As a result, it has become important to invent low boron glass formulations to better serve this specialty market. As used herein, the terms "low boron" and "substantially boron-free" mean that no boron is intentionally added to the glass-making formulation. Some natural glass-making raw materials contain trace amounts of boron oxide ($B_2O_3$) as a low-level contaminant, but the intent in low-boron glasses is to hold the boron level as low as practically feasible.

HEPA filtration products are typically made by processing very fine glass fibers through specialty paper-making equipment to make a blanket of fiber glass media known as fiberglass "paper". This equipment uses a wilt process wherein an aqueous solution known in the industry as "white water" is maintained under specific conditions which are necessary to achieve the required dispersion of the fibers therein. In particular, white water is often controlled to a low pH condition of about 2.5. This condition results in good fiber dispersion as well as an acceptable bond between the fibers thereby giving the resulting paper adequate strength. The fibers must have appropriate and balanced levels of acid attack resistance to give a level of bonding sufficient to form a suitable paper structure. Too little acid attack will result in weak papers from inadequate bonding. Too much acid attack will result in weak fibers from excessive dissolution. In addition, the papers will become weaker over time, unless they have adequate resistance to humidity attack. In particular, HEPA filters require the fiberglass paper to be pleated to get high filter surface areas in a small volume. If the paper is brittle or weak after storage, cracking occurs during pleating, thus ruining the filter.

Conventional boron-containing glass is an industry standard for manufacturing microfibers suitable for HEPA filters. For example, JM-475 glass manufactured by Johns Manville International Inc. contains significant levels of $B_2O_3$ (above 10 weight percent), thus making this glass composition undesirable for use in filters intended for semiconductor clean-rooms. Such glass has a viscosity sufficiently low to achieve a reasonable glass fiber production rate and allow the use of high temperature super-alloy as bushing or pot materials instead of using very expensive precious metal alloy (Pt—Rh alloy). It has also been found that, during the flame-attenuation fiberization process used to make the preferred fine diameter glass fibers, a highly durable "shell" is formed on the surface of the glass fiber as a result of the volatizing of alkali oxide ($R_2O$) and $B_2O_3$ from the fiber surface, most likely in the form of alkali metaborate. The formation of this durable shell is believed to be one of the main reasons that boron-containing glass has the desired combination of properties, such as a relatively low High Temperature Viscosity "HTV" for fiberization, defined as the temperature at which glass viscosity is 1000 poises, appropriate chemical durability against acid attack for the paper-making process, and excellent resistance against humidity aging, which are required for HEPA filtration media.

Unfortunately, it has been found that no such durable shell is formed on the surface of low-boron glass fibers during the flame-attenuation fiberizing process. Without the advantage of the formation of this durable shell, low-boron glass must possess high durability against both acid and moisture attack as its bulk property. This can be accomplished by significantly raising the $SiO_2$ and $Al_2O_3$ level in the glass formulation, which unfortunately results in much higher glass viscosity. Low-boron glass formulations that are presently commercially available have significantly higher viscosity than is desired for cost effective glass fiber manufacturing. Typically, the HTV for these formulations is greater than 2190° F. (1199° C.). In addition, their humidity resistance is typically somewhat poorer than is the case for conventional boron-containing HEPA filtration glass fibers like JM-475 glass.

Since boron has long been considered an air and water pollutant which is released from the glass composition during the glass-making process, considerable efforts have been made in the past to provide substantially boron-free glass compositions for making glass fibers. Although boron-free fiberizable glass compositions are described in the prior art, these compositions are not ideal for making fibers suitable for HEPA filters. For example, the boron-free glass compositions described in Erickson et al U.S. Pat. Nos. 3,847,626; 3,847,627; 3,876,481 and 4,026,715; Clark-Monks U.S. Pat. No. 3,929,497, Neely U.S. Pat. No. 4,199,364; Sproull U.S. Pat, No. 4,542,105 and Eastes et al U.S. Pat. No. 5,789,329 contain more than optimal amounts of $Al_2O_3$, which is partially soluble in the acid white water used in specialty paper-making equipment. Certain boron-free glass compositions described by Von Wranau et al U.S. Pat. No. 3,095,311 have lower amounts of $Al_2O_3$, but contain less than optimal levels of $SiO_2$, which adversely affect the durability of the fibers against the acid and humidity attack to which they are exposed when used as an HEPA filter media. Glass compositions available commercially from Evanite and Fibron (Laushar) have high silica, low-boron formulations, but have liquidus and high temperature viscosities that are not suitable for efficiently producing the fine glass fibers required for use in HEPA filters.

The achievement of very low boron glass formulations that result in glass fibers with both appropriate resistance to acid attack and adequate humidity resistance is quite challenging. This is especially true when it is also required that the glasses have appropriate values for viscosity and liquidus temperatures to meet the needs of commercial fine diameter glass fiber manufacturing. Accordingly, improved boron-free glass compositions suitable for efficiently making fibers for use in HEPA filters are greatly desired.

SUMMARY OF THE INVENTION

In general, the glass compositions of the present invention, and the fibers made therefrom, comprise 60–70% $SiO_2$, 1–7% $Al_2O_3$, 8–19% $Na_2O$, 0–6% $K_2O$ (wherein the sum of $Na_2O$ and $K_2O$ is less than 20%), 0–8% $Li_2O$, 3–10% CaO, 0–10% MgO, 0–4% BaO, 0–8% ZnO, 0–4% $TiO_2$ and 0–2% $F_2$, all expressed as mole percent of the glass composition. In a preferred embodiment, the glass composition and fibers comprise 62– 68% $SiO_2$, 2–6% $Al_2O_3$, 10–16% $Na_2O$, 0–6% $K_2O$ (wherein the sum of $Na_2O$ and $K_2O$ is less than 18%), 0–6% $Li_2O$, 3–10% CaO, 0–8% MgO, 0–3% ( BaO, 2–6% ZnO, $TiO_2$ and 0–2% $F_2$.

The glass compositions of the present invention are particularly adapted to provide glass fiber media which is useful for fabricating HEPA air filtration systems for cleanroom installations. Glass HEPA media are made from a blend of fine diameter glass fibers ranging from 0.2 to 2 micron. These products are rated for high filtration efficiency values while maintaining reasonably low pressure-drop characteristics.

The glass formulations used to produce the fine diameter fibers in accordance with this invention have insignificant levels of boron oxide and are characterized as "substantially boron-free", that is, containing only unintentionally introduced trace levels of $B_2O_3$. Thus, typical $B_2O_3$ levels in the glasses of the present invention are less than 500 ppm by weight.

The glass composition and fibers of the present invention exhibit stability in wet acidic environments and resistance to moisture attack during storage under humid ambient conditions, which are two important properties of glass fibers used in HEPA filtration applications. In addition, the glass of the preset invention have viscosity and liquidus temperature properties that are compatible with fiberglass manufacturing technologies used to produce fine diameter fibers, particularly flame attenuation processes.

DETAILED DESCRIPTION OF THE PREFERRED EMBODIMENTS

The specialty paper making process used to manufacture HEPA media involves dispersing the glass fibers in an acidic suspension referred to as "white water" by paper makers. As previously described, glass fibers suitable for HEPA filters must have properties which allow them to function adequately in this environment. A simulation for the entire paper-making process is based upon making "handsheets" from glass fibers having mean fiber diameters of about 0.7 microns and prepared from the various test glass compositions being evaluated. These handsheet are a surrogate for actual commercially prepared specialty papers. Specimens for tensile testing are cut from the hand sheets and tested for tensile strength as a function of exposure time under controlled humidity conditions. Both straight tensile strength and folded tensile strength tests are typically made, the latter being used to simulate the pleating operation in filter manufacture. The size and amount, as well as the nature, of the "acid bonds" formed during the wet white water process determines the tensile strength of the fiberglass paper sheets produced on the specialty paper-making equipment. It is desirable that a tacky hydrosilica gel layer be formed at the fiber surface during the wet white water process as a result of the weak acid attack, by a typically pH2.0–pH3.0 $H_2SO_4$ solution. At the fiber junctions, such hydrosilica gel layers promote the formulation of desirable bonding between glass fibers to give the handsheets or papers good mechanical strength.

Straight tensile strength (zero humidity exposure) should correlate well with the level of ions leached from the fibers by the acid white water. If the fibers release too small an amount of ions, the bonding between fibers is weak and initial tensile strength is too low. If the fibers are too severely attacked, the fibers are weakened and easily broken, with resulting handsheet tensile strength again too low. Therefore, acceptable HEPA glass compositions can be characterized by an optimum level of fiber attack by the acid white water, as determined by hand sheet testing results.

The following lab test was developed to simulate the dissolution that glass fibers experience in the paper-maker's white water: 0.2 gram of fibers are exposed to 100 ml of pH 2.50 sulfuric acid solution for an hour at room temperature. The resulting solution is analyzed by Inductively Coupled Plasma "ICP", and the dissolved ions are reported in parts per billion (ppb). After measuring the fiber diameter distribution of the fibers and calculating their surface area per gram, or alternatively measuring the surface area by the BET method (a widely used and known method of measuring surface area), the acid dissolution results for various fiber compositions can be compared by normalizing to a common surface area. A normalized surface area of 2.0 $m^2/g$ was used. Experimental glass formulations may be compared lo the results obtained for a conventional boron-containing glass, such as JM-475 glass, as part of making a judgment about their suitability for HEPA filtration media.

After exposure to the acidic paper-making conditions, the resulting fiberglass papers must withstand atmospheric humidity during filter manufacture and while in subsequent service as filtration media. A number of approaches have been used to evaluate resistance of a glass fiber to wet environments. One commonly used criterion is a water durability test where the weight loss of the fiber is determined when exposed to water at 205° F. (96° C.) for 24 hours. Another test sometimes used involves the evaluation of the loss in strength of a fiber as a function of aging time in a humid environment. This result can be characterized by measuring the decrease in tensile strength as a function of humidity exposure time (referred to as "humidity aging"). In the humidity aging test, handsheet papers were made from glass fibers with average diameter of 0.65 micron. The handsheet samples were then aged in the humidity chamber at 95 F. and 90% relative humidity. Tensile tests were performed on samples after aged for different time periods to determine the performance of these fibers. Tensile tests are consisted of tests on both the straight and folded samples. The glass fiber media of the present invention have initial straight and folded tensile strength above 4 lbs/in and 2 lbs/in, respectively, and less than 40% loss of tensile strength after one week's aging. A humidity aging test is preferred because it better represents the commercially important conditions.

The glass compositions of the present invention have properties that allow them to be fiberized by conventional flame-attenuation processes known in the glass-making art. Such processes are preferred because they produce the fine diameter glass fibers required for HEPA air filtration. In some cases, however, the slightly coarser fibers often used in combination with the fine fibers in some air filters are produced by conventional rotary fiberization technologies. Therefore, the preferred glass compositions of the present invention can be used in both processes. Specifically, the glasses of the present invention have a viscosity that is sufficiently low at fiberization temperatures to realize reasonable fiberization rates and efficiencies in flame attenuation processes and to avoid the use of expensive precious metal alloys (typically Pt—Ir alloy) as the bushing, pot or spinner material.

The preferred fibers for the HEPA filter media of the present invention are flame attenuated fibers. These fibers are formed by drawing continuous primary glass filaments from a bushing, rod, or pot and introducing these continuous primary glass filaments into the high energy gaseous blast of a flame attenuation burner, such as a Selas burner, where the continuous filaments are reheated, attenuated and formed into fine diameter staple or finite length glass fibers of the desired diameter.

The glasses of the present invention preferably have an HTV less than 2200° F., and ideally less than 2000° F. in order to be suitable for flame attenuation. Glasses with HTV values of greater than 2200° F. are generally processed inefficiently in flame attenuation processes at low production rates with the use of Pt—Rh alloy as busing materials. As noted, it is also desirable for the same glass to perform adequately in rotary processes, where typical operating temperatures are often lower than for flame attenuation. Therefore, the HTV for glasses of the present invention may be about or even below 1900° F. so that they are suitable for use in rotary fiberization processes. However, the preferred glasses with higher HTV values are often acceptable in rotary fiberization at relatively reduced production rates. The most preferred glass compositions of the present invention have an HTV of between about 1850° F. and about 2150° F.

In addition, glass compositions of the invention also have a liquidus temperature at least 80° F. less than the HTV so that the composition is at least suitable for rotary fiberization processes. Preferred glass compositions have a liquidus temperature that is at least 150° F. below the HTV, most preferably from 250° F. to 300° F. below the HTV, in order to avoid devitrification (crystallization) problems during non-rotary, pot and marble or other flame attenuation fiberization processes.

The glass formulations of the present invention result in low-boron-containing HEPA filtration glasses that possess the unique properties that meet these general criteria for fiberization using conventional rotary and flame attenuation processes and the demands of the paper-making process. These properties are the result of novel combinations of components in the glass compositions of the present invention. As described summarized above, in its broadest aspects, the glass formulations of the invention comprise 60–70% $SiO_2$, 1–7% $Al_2O_3$, 8–19% $Na_2O$, 0–6% $K_2O$ (wherein the sum of $Na_2O$ and $K_2O$ is less than 20%), 0–8% $Li_2O$, 3–10% CaO, 0–10% MgO, 0–4% BaO, 0–8% ZnO, 0–4% $TiO_2$ and 0–2% $F_2$, all expressed as mole percent of the glass composition. In a preferred embodiment, the glass composition and fibers comprise 62–68% $SiO_2$, 2–6% $Al_2O_3$, 10–16% $Na_2O$, 0–6% $K_2O$ (wherein the sum of $Na_2O$ and $K_2O$ is less than 18%), 0–6% $Li_2O$, 3–10% CaO, 0–8% MgO, 0–3% BaO, 2–6% ZnO, 0–2% $TiO_2$ and 0–2% $F_2$.

In the practice of this invention, it is preferable to have the $SiO_2$ concentration higher than 60 mol % to ensure a high degree of cross-linked glass network structure for adequate chemical durability against acid and moisture attack. However, $SiO_2$ levels higher than about 70 mol % will likely result in glass viscosity that is too high, and thus are not preferred.

In general, increasing the level of $Al_2O_3$ increases humidity resistance, but $Al_2O_3$ is partially soluble in acid and brings with it a strong increase in glass viscosity. It has been found in accordance with this invention that the moisture resistance of a glass increases very strongly below the 3 mol % range, but further increasing the $Al_2O_3$ will have less effect. Therefore, compositions of this invention contain 1–7 mol % $Al_2O_3$, and preferably 2–6 mol % $Al_2O_3$, to obtain the best compromise for good acid durability, good moisture resistance, and reasonably low viscosity.

Use of fluorine can significantly reduce the acid resistance, but its strong effect on lowering glass viscosity makes it useful in preferred glass formulations of the present invention. Furthermore, the replacement of small amounts of fluorine for $Na_2O$ and $K_2O$ in conventional glass formulations, i.e. a level of less than 2 mol % $F_2$, has been shown to be beneficial to the moisture resistance of certain glasses of the present invention.

It was shown that $TiO_2$ enhances acid resistance better than $SiO_2$, while decreasing viscosity when substituted for $SiO_2$ in conventional glass formulations. Unfortunately, it was also discovered that $TiO_2$ may charge the mechanism of glass fiber dissolution in white water from a predominantly ion-exchange process to a more congruent dissolution, thereby hindering the formation of the "tacky" hydrasilica gel layer on the fiber surface. Thus, the formation of this hydragel layer is believed to be important to promote the strong acid bond at fiber junctions. Furthermore, the ability to use $TiO_2$ for improved properties in silicate glasses is limited because it tends to increase the glass liquidus temperature and promote crystal formation. Therefore, it is preferred to limit $TiO_2$ to below 4 mol %, and preferably below 2 mol %.

It is known in the industry that RO (wherein R is Ca or Mg) is useful to lower the glass viscosity while further enhancing chemical durability. It has been found in accordance with this invention that MgO at a level of 0–10 mol %, preferably 0–8 mol %, is more effective in enhancing the chemical duability of the glass than CaO. However, CaO may help promote the formation of acid bonding in fiberglass papers and is therefore present in the formulations of the present invention at levels of 3–10 mol %.

It has previously been known that ZnO has the desirable influence of increasing humidity resistance while exerting a viscosity influence similar to MgO. In addition, it has now surprisingly been discovered that ZnO does not carry with it an undesirable increase in liquidus. ZnO is present in the glass formulations of the present invention at a levels less than 10 mol %, and preferred formulations contain 2–6 mol % ZnO.

It has also been found that $Li_2O$, when used to partially replace $Na_2O$ and $K_2O$ in conventional glass formulations, can significantly reduce glass viscosity while enhancing glass resistance against acid and moisture attack. It has also been found that use of $Li_2O$ will not adversely influence the formation of acid bonding. However, $Li_2O$ is relatively expensive and may promote devitrification when it is used in high amounts. Accordingly, $Li_2O$ is present in the glass formulations of the present invention at levels less than 8 mol %, and preferably less than 6 mol %.

Glass compositions of the present invention also may contain BaO at a level of 0–4 mol %, preferably 0–3 mol %, in order to lower liquidus temperature and suppress devitrification.

As shown above, newly discovered influences of the above ingredients in glass compositions, and their interaction with each other and the other glass ingredients, have been utilized in complex glass-making systems to provide novel glass compositions. The glasses of this invention are not only suitable for flame attenuated or rotary processing into fine glass fibers, but the fibers made from these compositions are appropriately resistant to acid white water attack and the resulting specialty fiberglass papers exhibit sufficient humidity resistance to withstand handling and pleating into HEPA filters. Accordingly, the resulting boron-free glass fibers are particularly well suited for the demanding requirements of electronic clean-room HEPA filtration.

The following examples, which are intended to illustrate but not limit the invention, further demonstrate the importance of the ingredients of the glass formulation in accordance with the present invention.

EXAMPLES 1–4

Glass fibers were prepared in accordance with the present invention using the following procedure:

About 50 lbs of glass was melted in Pt crucibles and then the glass melt was cast into small lens shape, approximately 1" in diameter.

Glass lens were then reheated in a Pt bushing to form primaries in an experimental set-up.

Glass primaries were attenuated into fine glass fibers with an average diameter of 0.65 micron using a conventional flame attenuation process.

HTV and liquidus temperature measurements were made on bulk glass.

Handsheets were made from these 0.65 micron microfibers. For each 8"×8" handsheet, 5.0 gram of microfibers were thoroughly mixed with diluted $H_2SO_4$ solution with pH=2.0–2.2. The mixed slurry was then set on a 100 mesh screen during draining to form handsheet. The handsheets were removed from the screen, dried and stored for subsequent tests.

Tensile tests and humidity aging tests were performed on these handsheets. Fiberglass handsheets were cut into 1" wide strips, and then grouped for humidity aging treatment at 95° F. and 90% relative humidity. Straight tensile was measured directly on these fiberglass handsheet strips with a 4" gage length. For double-folded tensile tests, the strips were first bent 180° around a ³⁄₁₆" diameter rod and then gently pressed with a 2000 gram weight along the fold after the rod was removed. The folded strip was then again bent 180° on the opposite side of the sheet and press with the weight along the fold. Folded tensile was then measured on these double folded handsheet strips with a 4" gage length.

The formulations of each of the examples are provided below (in mole percent):

| Component (Mole %) | Ex. 1 | Ex 2 | Ex 3 | Ex 4 |
|---|---|---|---|---|
| $SiO_2$ | 65.75 | 65.53 | 66.83 | 64.79 |
| $B_2O_3$ | 0.01 | 0.01 | 0.01 | 0.01 |
| $Al_2O_3$ | 3.63 | 2.91 | 2.96 | 2.97 |
| $Na_2O$ | 14.50 | 11.45 | 11.60 | 11.67 |
| $K_2O$ | 0.87 | 0.65 | 0.72 | 0.67 |
| $Li_2O$ |  | 3.97 | 3.81 | 4.05 |
| CaO | 5.83 | 6.90 | 5.61 | 5.80 |
| MgO | 5.63 | 5.10 | 5.58 | 3.95 |
| BaO | 0 | 0 | 0 | 0.79 |
| ZnO | 3.79 | 2.91 | 2.87 | 3.72 |
| $F_2$ | 0 | 1.56 | 0 | 1.60 |
| HTV (° F.) | 2192 | 2034 | 2109 | 2006 |
| Liquidus (° F.) | 1825 | 1810 | 1832 | 1697 |

-continued

| Component (Mole %) | Ex. 1 | Ex 2 | Ex 3 | Ex 4 |
|---|---|---|---|---|
| Acid Resistance | Okay | Okay | Okay | Okay |
| Humidity Resistance | Good | Okay | Okay | Okay |
| Handsheet tensile | Good | Good | Good | Good |

As indicated in the above table, all glass compositions with formulations in accordance with the present invention provided an acceptable combination of HTV, liquidus temperature, acid and humidity resistance, and handsheet tensile strength for processing into paper and/or HEPA filters as set forth above.

EXAMPLE 5–9

Several test glass compositions were prepared using the procedure of Examples 1–4, but with following formulations which fell outside the present invention:

| Oxide (Mole %) | Ex. 5 | Ex. 6 | Ex. 7 | Ex. 8 | Ex. 9 |
|---|---|---|---|---|---|
| $SiO_2$ | 62.37 | 60.77 | 59.15 | 69.56 | 65.30 |
| $B_2O_3$ | 0.02 | 0.02 | 0.01 | <0.010 | 0.01 |
| $Al_2O_3$ | 1.72 | 1.72 | 1.86 | 1.95 | 3.53 |
| $Na_2O$ | 17.93 | 17.58 | 18.34 | 10.82 | 14.76 |
| $K_2O$ | 0.69 | 0.64 | 0.64 | 3.55 | 0.78 |
| CaO | 0 | 0.26 | 0.27 | 0.22 | 2.25 |
| MgO | 14.24 | 15.00 | 14.77 | 13.37 | 5.41 |
| BaO | 1.18 | 0.37 | 1.15 | 0 | 0 |
| ZnO | 0 | 0 | 0 | 0.49 | 3.44 |
| $TiO_2$ | 0 | 0 | 2.24 | 0.02 | 4.53 |
| $P_2O_5$ | 0 | 2.00 | 0 | 0 | 0 |
| $F_2$ | 1.87 | 1.64 | 1.55 | 0 | 0 |
| HTV (° F.) | 1981 | 2033 | 1910 | 2355 | 2176 |
| Liquidus (° F.) | 1616 | 1624 | 1595 | <1300 | 1600 |
| Acceptable Acid Resistance | No | No | No | Close | Too high |
| Humidity Resistance | No | No | No | Close | Okay |
| Handsheet tensile | Poor | Poor | Poor | Good | Inconsistent |

Examples 5 and 6, with more than the specified amounts MgO and more $Na_2O$ and K2O than preferred, exhibited inadequate acid and humidity resistance, as well as poor handsheet tensile strength. Example 7 with a similar formulation to Example 6, but with lower than the specified amounts of $SiO_2$ and greater amounts of $TiO_2$ than preferred, showed a slight improvement in acid and humidity resistance but still not adequate for processing into paper and/or HEPA filters. Example 8, which contained acceptable amounts of the alkali metal oxides but still contained more MgO than specified and higher levels of $SiO_2$ than preferred, resulted in better resistance and tensile strength, but exhibited an unacceptably high HTV. Example 9 contained more than the specified amount of TiO2 and resulted in an acid resistance that was too high and inconsistent tensile strength.

EXAMPLE 10

Tensile Handsheet Preparation for Micro-Strand Products

Ingredients:

5 Grams Fiber 500 ml DI Water 5 ml 1.8N Sulfuric Acid

Measure ingredients listed above and blend in a blender for 30 seconds at the low setting and then 90 seconds at the high setting.

Prepare a standard 8"×8" handsheet mold with a 100 mesh screen and add approximately 50 mls 1.8N Sulfuric acid to DI water as mold fills. Target pH for the mold is between 2 and 2.2 and should be adjusted accordingly.

Add blended slurry, agitate with handsheet mold agitator 2 to 3 times, drain and vacuum off excess water. Place handsheet into oven at 100–150° C. until about half dry. Transfer the sheet to another screen to complete drying. Completely drying a handsheet on the screen which it was formed will result in the sheet adhering to the screen.

Use a strip cutting device to cut off approximately 0.25" from each edge. Cut the remaining sample into 7 equal strips of 1" width.

Test strips using 0.5"/minute with a 4" gage length. Record peak load in lbs/in and percent elongation.

For double-folded tensile tests, bend strip 180° around a 3/16" diameter rod, remove rod and gently place a 2000 gram weight along the fold. Remove the weight, bend the strip 180° on the opposite side of the sheet and again gently place the weight along the fold. Unfold the strip and place in the testing jaws for testing.

EXAMPLE 11

Humid Aging Study for Micro-Strand

Prepare 15 tensile handsheets for each sample to be included in the study. It is best to include a sample of standard product, usually 475, with a similar fiber diameter to the samples being tested, as the "control" sample.

Cut each handsheet into 7 tensile strips of equal length and 1" wide. Strips should be of equal length so strip weight can be used to identify outlier samples caused by uneven handsheet formation. This should result in 105 test strips per sample.

Each of the 105 test strips is numbered for identification and weighed. A designation is included for each sample so samples can be differentiated.

The strips are weighed, the values are computer collected. At this point any "outlier" strips, determined by strip weight, are removed and replaced by one of the extra five strips. Only 100 of the 105 strips are needed for the study. By randomly placing test strips into the various categories, no bias should be caused by individual handsheet formation. All categories should result with 10 strips with equal average weights and standard deviations.

Sort test strips into categories and load into the humidity chamber. Load samples such that the next sets to be tested will be on the top of the chamber for easier access. Do not load 0-hour condition samples as they are tested without any heat and humidity treatment. All subsequent sample sets are compared to the 0-hour sets and checked for degeneration in tensile results caused from humid aging. The test chamber is set to 95° F. and 90% relative humidity.

Samples for both straight and folded tensile are tested after 6-hours, 24-hours, 72-hours, and 168-hours of treatment.

T-tests analyses are used to determine significant differences in sample set data, and samples of each data set averaged.

What is claimed is:

1. A substantially boron-free fiberglass HEPA air filtration media comprising a paper of glass fibers comprising the following by mole percent:

| | |
|---|---|
| 62–68% | $SiO_2$ |
| 2–6% | $Al_2O_3$ |
| 10–16% | $Na_2O$ |
| 0–6% | $K_2O$ |
| 0–6% | $Li_2O$ |
| 3–10% | $CaO$ |
| 0–8% | $MgO$ |
| 0–3% | $BaO$ |
| 2–6% | $ZnO$ |
| 0–2% | $TiO_2$ |
| 0–2% | $F_2$ | wherein the total amount of $Na_2O$ and $K_2O$ is less than 18 mol %, and with the glass composition of the glass fibers having an HTV of between about 1850° F. and about 2200° F., and a liquidus temperature of at least 250° F. below said HTV.

2. A fiberglass air filtration media according to claim 1 having acid white water resistance sufficient to lose less than 16,000–18,000 ppb total ions when dissolved in pH 2.5 sulfuric acid solution for an hour at room temperature.

3. Substantially boron-free fiberglass HEPA air filtration media comprising a paper of glass fibers comprising the following in mole percent:

| | |
|---|---|
| 60–70% | $SiO_2$ |
| 1–7% | $Al_2O_3$ |
| 8–19% | $Na_2O$ |
| 0–6% | $K_2O$ |
| 0–6% | $Li_2O$ |
| 3–10% | $CaO$; |
| 0–10% | $MgO$ |
| 0–4% | $BaO$ |
| 0–8% | $ZnO$ |
| 0–4% | $TiO_2$; and |
| 0–2% | $F_2$; | wherein the total amount of $Na_2O$ and $K_2O$ is less than 20 mol %, with the glass composition of the glass fibers having an HTV of between about 1850° F. and about 2200° F., and a liquidus temperature at least 250° F. below said HTV.

4. Fiberglass air filtration media according to claim 3 wherein said glass fibers have sufficient resistance to acid attack and humidity to enable processing of said fibers through specialty paper-making equipment using acid white water.

5. Fiberglass air filtration media according to claim 3 wherein said glass fibers are flame-attenuated glass fibers.

6. A process for manufacturing substantially boron-free fiberglass air filtration media which comprises:

a) fiberizing into glass fibers using a flame attenuation or rotary process a glass composition comprising the following in mole percent:

| | |
|---|---|
| 60–70% | $SiO_2$ |
| 1–7% | $Al_2O_3$ |
| 8–19% | $Na_2O$ |
| 0–6% | $K_2O$ |
| 0–6% | $Li_2O$ |
| 3–10% | $CaO$ |
| 0–10% | $MgO$ |
| 0–3% | $BaO$ |

-continued

|  |  |
|---|---|
| 0–8% | ZnO |
| 0–4% | $TiO_2$; and |
| 0–2% | $F_2$ | wherein the total amount of $Na_2O$ and $K_2O$ is less than 20 mol %, with the glass composition of the glass fibers having an HTV of between about 1850° F. and about 2200° F., and a liquidus temperature at least 250° F. below said HTV, and b) processing said glass fibers through specialty paper-making equipment using weakly acidic white water 2.5–3.0 pH to provide a fiberglass paper.

7. A process according to claim 6 wherein said fiberglass paper is further pleated without cracking.

8. A process according to claim 6 wherein said paper has an average air filtration efficiency of at least 99.5 percent removal of 0.3 micron and greater particles.

9. A process according to claim 6 wherein said paper has an average air filtration efficiency of at least 99.9 percent removal of 0.3 micron and greater particles.

10. A substantially boron-free fiberglass HEPA air filtration media comprising a paper of glass fibers comprising the following by mole percent:

|  |  |
|---|---|
| 62–68% | $SiO_2$ |
| 2–6% | $Al_2O_3$ |
| 10–16% | $Na_2O$ |
| 0–6% | $K_2O$ |
| 3–10% | CaO |
| 0–8% | MgO |
| 0–3% | BaO |
| 2–6% | ZnO |
| 0–2% | $TiO_2$ |
| 0–2% | $F_2$ | wherein the total amount of $Na_2O$ and $K_2O$ is less than 18 mol % and the composition further contains $Li_2O$ in an amount no greater than 6%, wherein the glass composition of the fibers has an HTV less than about 2200° F.

11. Fiberglass air filtration media according to claim 10, having an HTV of between about 1850° F. to about 2200° F.

12. Fiberglass air filtration media according to claim 11 having a liquidus temperature at least 250° F. below said HTV.

13. Fiberglass air filtration media according to claim 10 having acid white water resistance sufficient to lose less than 16,000–18,000 ppb total ions when dissolved in pH 2.5 sulfuric acid solution for an hour at room temperature.

14. Fiberglass air filtration media according to claim 10, wherein the HTV is less than 2150° F.

15. Fiberglass air filtration media according to claim 10, wherein the HTV is less than 2000° F.

16. Fiberglass air filtration media according to claim 10, wherein the HTV is no greater than 2109° F.

17. Substantially boron-free fiberglass HEPA air filtration media comprising a paper of glass fibers comprising the following in mol percent:

|  |  |
|---|---|
| 60–70% | $SiO_2$ |
| 1–7% | $Al_2O_3$ |
| 8–19% | $Na_2O$ |
| 0–6% | $K_2O$ |
| 3–10% | CaO; |
| 0–10% | MgO |
| 0–4% | BaO |
| 2–6% | ZnO |
| 0–4% | $TiO_2$; and |
| 0–2% | $F_2$; | wherein the total amount of $Na_2O$ and $K_2O$ is less than 20 mol %, and the composition further containing $Li_2O$ in an amount no greater than 8%, wherein the glass composition of the glass fibers has an HTV less than about 2200° F.

18. The fiberglass air filtration media according to claim 17, wherein the amount of $Li_2O$ is less than 6%.

19. The fiberglass air filtration media according to claim 17, wherein the HTV is less than 2150° F.

20. The fiberglass air filtration media according to claim 17, wherein the HTV is less than 2000° F.

21. The fiberglass air filtration media according to claim 17 wherein said glass fibers have sufficient resistance to acid attack and humidity to enable processing of said fibers through specialty paper-making equipment using acid white water.

22. Fiberglass air filtration media according to claim 17 wherein said glass fibers are flame attenuated glass fibers.

23. A process for manufacturing substantially boron-free fiberglass air filtration media which comprises:

a) fiberizing into glass fibers using a flame attenuation or rotary process a glass composition comprising the following in mole percent:

|  |  |
|---|---|
| 60–70% | $SiO_2$ |
| 1–7% | $Al_2O_3$ |
| 8–19% | $Na_2O$ |
| 0–6% | $K_2O$ |
| 3–10% | CaO |
| 0–10% | MgO |
| 0–3% | BaO |
| 2–6% | ZnO |
| 0–4% | $TiO_2$; and |
| 0–2% | $F_2$ | wherein the total amount of $Na_2O$ and $K_2O$ is less than 20 mol %, the composition further containing $Li_2O$ in an amount no greater than 8%, wherein the glass composition of the glass fibers has an HTV less than about 2200° F. and b) processing said glass fibers through specialty paper-making equipment using weakly acidic white water 2.5–3.0 pH to provide a fiberglass paper.

24. The process according to claim 23, wherein the amount of $Li_2O$ in the glass composition is less than 6%.

25. The process according to claim 23, wherein the HTV is less than 2150° F.

26. The process according to claim 23, wherein the HTV is less than 2000° F.

27. The process according to claim 23 wherein said fiberglass paper is further pleated without cracking.

28. The process according to claim 23 wherein said paper has an average air filtration efficiency of at least 99.5 percent removal of 0.3 micron and greater particles.

29. The process according to claim 23 wherein said paper has an average air filtration efficiency of at least 99.9 percent removal of 0.3 micron and greater particles.

* * * * *